US012511865B2

(12) United States Patent
Maruyama et al.

(10) Patent No.: US 12,511,865 B2
(45) Date of Patent: Dec. 30, 2025

(54) OVERHEAD WIRE RECOGNITION DEVICE AND OVERHEAD WIRE RECOGNITION METHOD

(71) Applicant: Hitachi Solutions, Ltd., Tokyo (JP)

(72) Inventors: Kishiko Maruyama, Tokyo (JP); Nobutaka Kimura, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 519 days.

(21) Appl. No.: 17/956,982

(22) Filed: Sep. 30, 2022

(65) Prior Publication Data
US 2023/0121854 A1    Apr. 20, 2023

(30) Foreign Application Priority Data

Oct. 14, 2021  (JP) ................................. 2021-168961

(51) Int. Cl.
*G06V 10/46*   (2022.01)
*G06T 7/10*    (2017.01)
(Continued)

(52) U.S. Cl.
CPC ............... *G06V 10/46* (2022.01); *G06T 7/10* (2017.01); *G06T 7/70* (2017.01); *G06T 7/73* (2017.01);
(Continued)

(58) Field of Classification Search
CPC ...... G06V 10/46; G06V 20/64; G06V 20/647; G06V 10/761; G06V 20/56; G06V 20/176;
(Continued)

(56) References Cited

U.S. PATENT DOCUMENTS

| 11,521,357 B1 * | 12/2022 | Côté | G06T 17/00 |
| 2018/0218214 A1 * | 8/2018 | Pestun | G06V 20/176 |

(Continued)

FOREIGN PATENT DOCUMENTS

| CN | 110084785 A | * | 8/2019 | G06K 9/0063 |
| CN | 114332415 A | * | 4/2022 | |

(Continued)

*Primary Examiner* — John Villecco
*Assistant Examiner* — Joshua B. Crockett
(74) *Attorney, Agent, or Firm* — MATTINGLY & MALUR, PC

(57) ABSTRACT

An overhead wire recognition device and method are capable of overhead wire recognition based on plural images taken by an imaging device such as a digital camera. The overhead wire recognition device includes an input unit to which multi-viewpoint images taken by a camera from different viewpoints and camera positions/attitudes are inputted, an overhead wire candidate extraction unit which selects, from the multi-viewpoint input images inputted to the input unit, an overhead wire region including an overhead wire and extracts, from the overhead wire region, a line segment as a candidate of the overhead wire, and an overhead wire model estimation unit which projects the candidate line segment in an imaginary 3D space, determines, based on the candidate line segment, the camera positions/attitudes, and the multi-viewpoint images, a plane where the overhead wire is present in the 3D space, and estimates a 3D model of the overhead wire.

4 Claims, 16 Drawing Sheets

(51) Int. Cl.
    *G06T 7/70*          (2017.01)
    *G06T 7/73*          (2017.01)
    *G06V 10/74*        (2022.01)
    *G06V 20/56*        (2022.01)
    *G06V 20/64*        (2022.01)

(52) U.S. Cl.
    CPC .............. *G06T 7/75* (2017.01); *G06V 10/761* (2022.01); *G06V 20/56* (2022.01); *G06V 20/64* (2022.01); *G06T 2207/30244* (2013.01); *G06V 20/647* (2022.01)

(58) Field of Classification Search
    CPC .... G06T 7/73; G06T 7/10; G06T 7/75; G06T 2207/30244; G06T 2207/30252
    See application file for complete search history.

(56) References Cited

U.S. PATENT DOCUMENTS

| | | | |
|---|---|---|---|
| 2021/0019897 A1* | 1/2021 | Biswas | G06T 7/11 |
| 2021/0103727 A1 | 4/2021 | Maruyama et al. | |
| 2021/0142074 A1* | 5/2021 | Nakano | G01S 7/487 |
| 2021/0407187 A1* | 12/2021 | Gupta | G01S 17/89 |

FOREIGN PATENT DOCUMENTS

| | | | | |
|---|---|---|---|---|
| JP | 2018129786 A | * | 8/2018 | |
| JP | 2021-60776 A | | 4/2021 | |
| JP | 2021060300 A | * | 4/2021 | |
| WO | WO-2011088509 A1 | * | 7/2011 | ............. B60M 1/28 |
| WO | WO-2020044589 A1 | * | 3/2020 | ............. G01B 11/02 |

\* cited by examiner

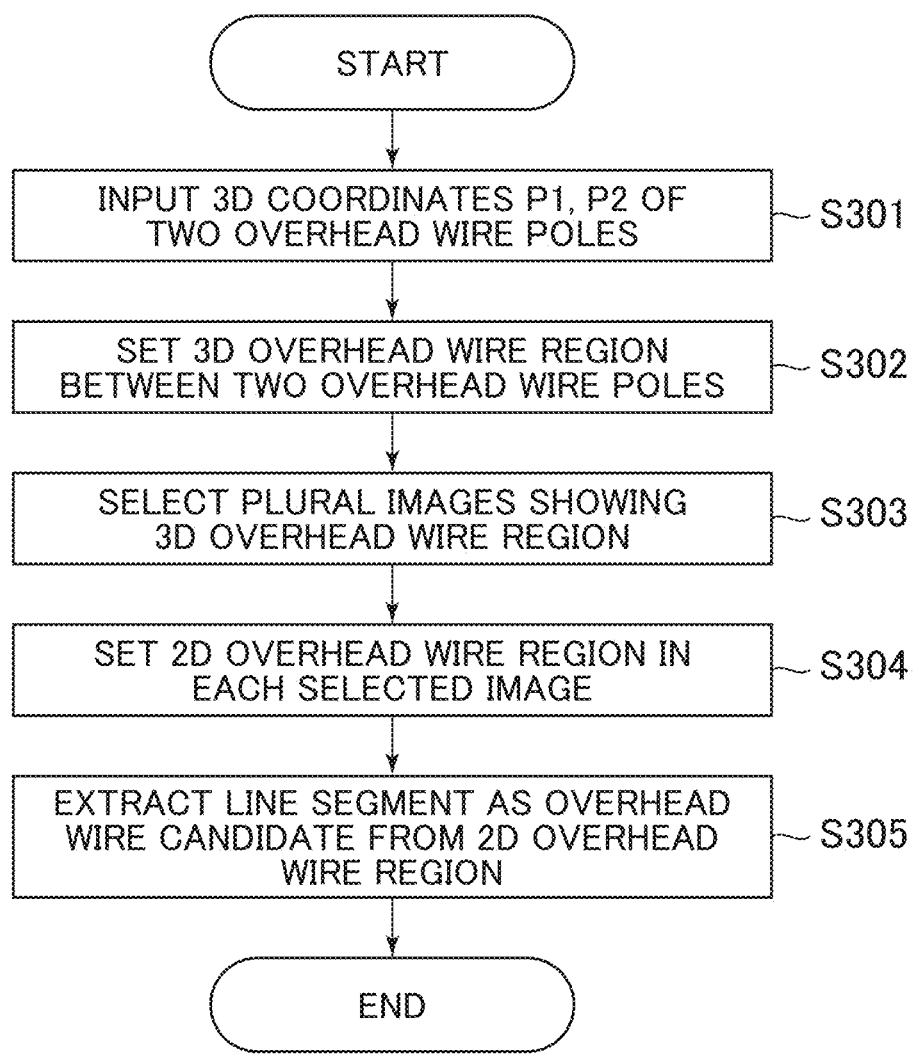

FIG. 5
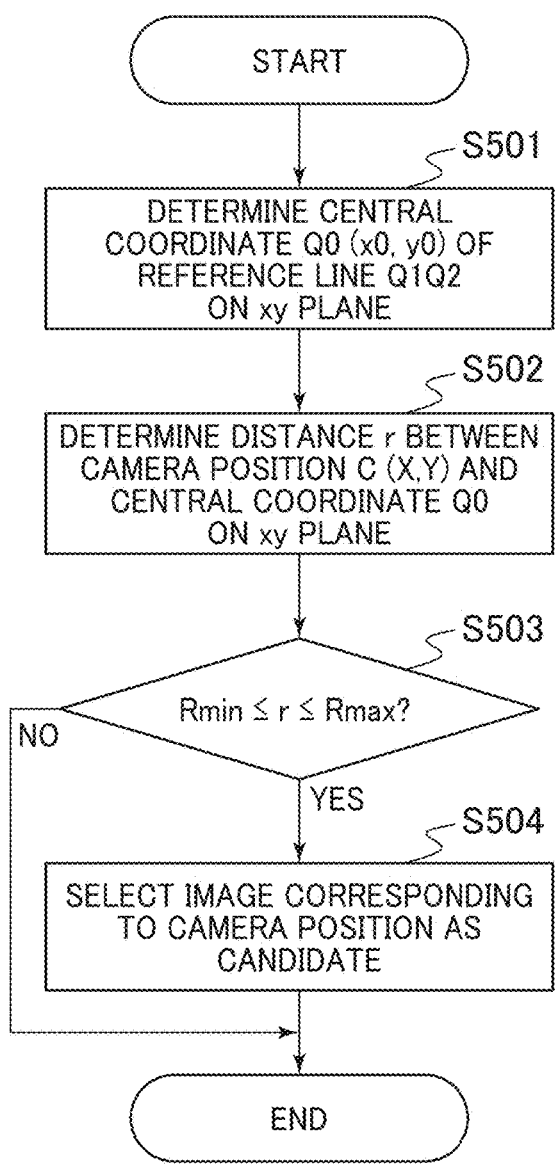
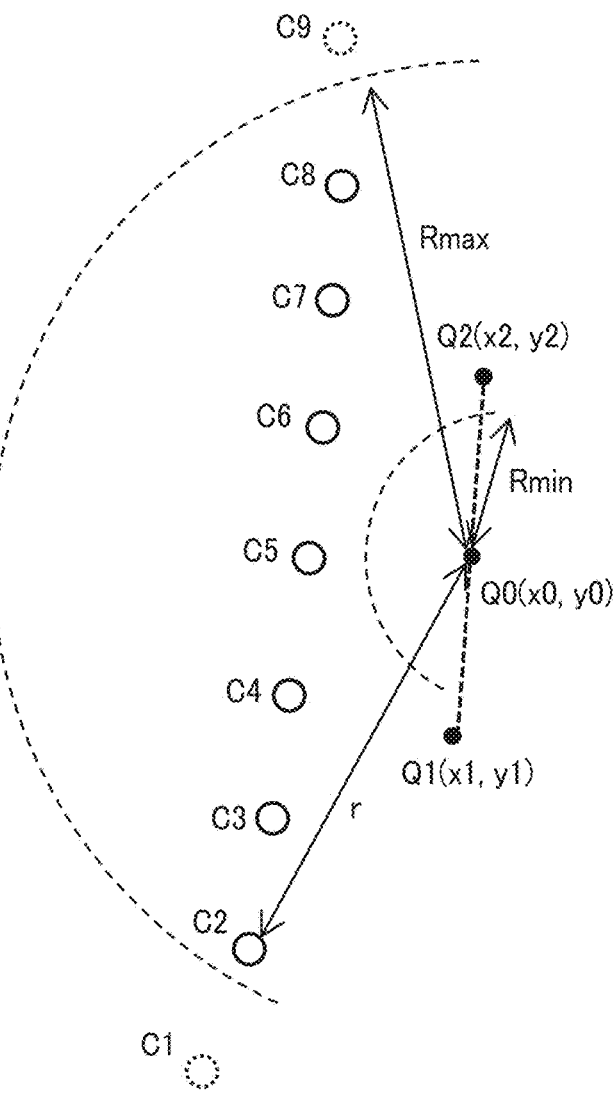

FIG. 6
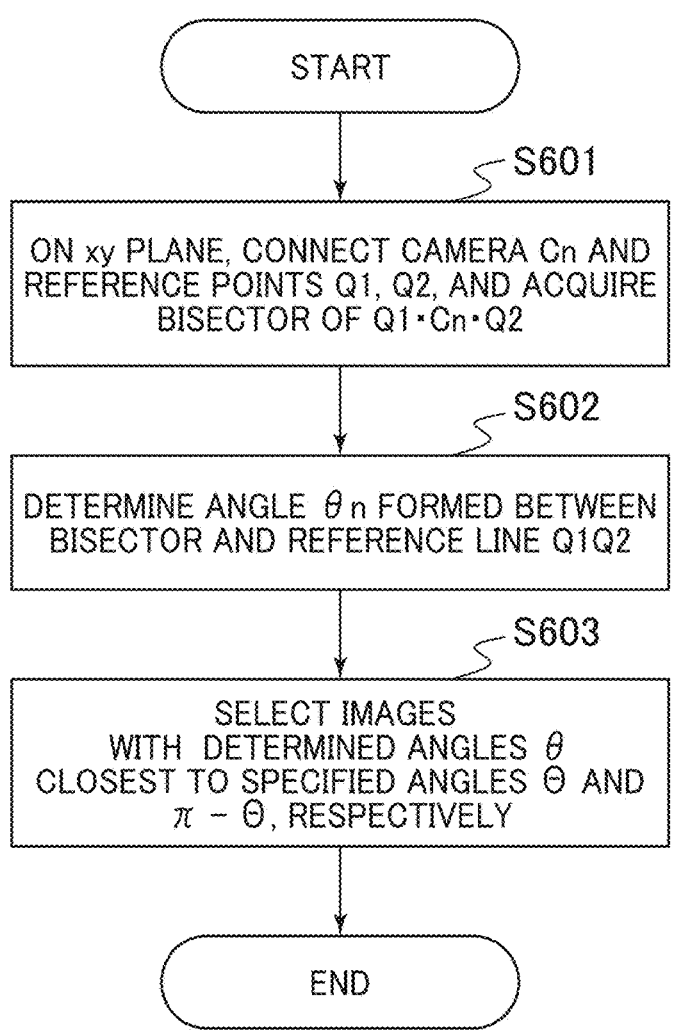
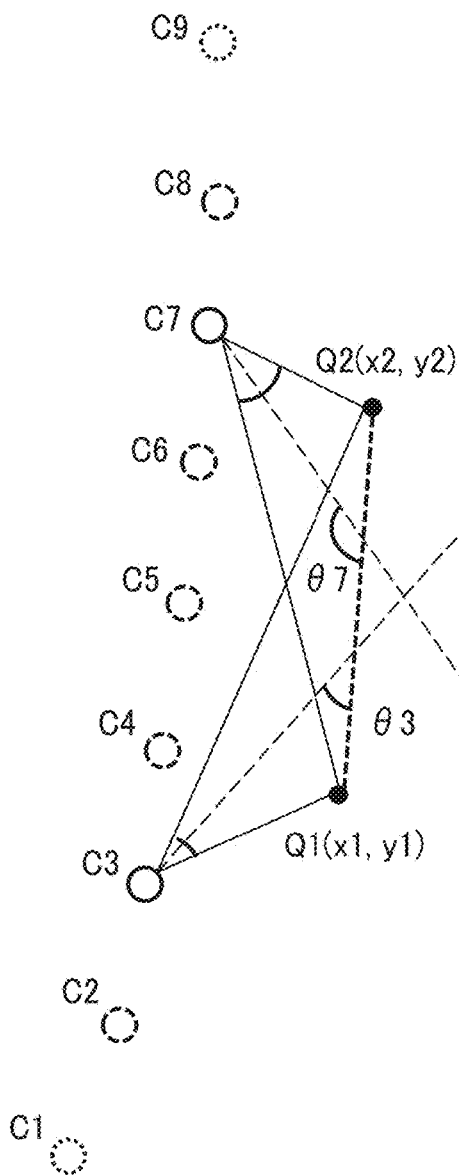

EXISTING TECHNIQUES

OVERHEAD WIRE RECOGNITION DEVICE AND OVERHEAD WIRE RECOGNITION METHOD

CROSS-REFERENCE TO RELATED APPLICATION

The present application claims priority from Japanese application JP2021-168961, filed on Oct. 14, 2021, the contents of which is hereby incorporated by reference into this application.

TECHNICAL FIELD

The present invention relates to an overhead wire recognition device and an overhead wire recognition method.

BACKGROUND ART

As an example of technique which makes it possible, by making aerial cable model estimation after separating, in three dimensional point cloud data, noise such as trees from an aerial cable, to extract the aerial cable even in cases where trees make up noise, Patent Literature 1 discloses a system provided with: a target area cutting-out unit which, from three-dimensionally formed three-dimensional point cloud data representing objects including an aerial cable, aerially installed via utility poles, and trees, cuts out, as a target area, a region where point cloud data on an aerial cable is, based on utility pole coordinates, assumed to be present; an aerial cable candidate extraction unit which extracts, from the three-dimensional point cloud data in the target area, aerial-cable candidate point cloud data; and an aerial cable model estimation unit which estimates an aerial cable model based on the extracted aerial-cable candidate point cloud data.

CITATION LIST

Patent Literature

Patent Literature 1: Japanese Unexamined Patent Application Publication No. 2021-60776

SUMMARY OF INVENTION

Technical Problem

A Mobile Mapping System (MMS) has been known in which a vehicle mounted with measuring devices such as a laser scanner, a digital camera, and a GPS receiver collects, while running, three-dimensional shapes of peripheral areas of the road in the form of 3D point clouds (three-dimensional point clouds).

The MMS can acquire three-dimensional shapes of extensive areas peripheral to a road efficiently and with high accuracy and is expected to be actively used to grasp conditions of road-peripheral equipment. For example, there are needs for applications for recognizing overhead wires (electric wires, communication lines, cables and the like) aerially laid around being supported by overhead wire poles.

In Patent Literature 1, a method is disclosed in which the shape of an overhead wire drooping due to gravitation is represented by a 3D model (three-dimensional model) and the overhead wire is recognized by matching between a 3D point cloud acquired using a laser scanner and the 3D model of the overhead wire.

On the other hand, a technique has been known for estimating a 3D model of an object using plural images taken by a digital camera from different viewpoints (multi-viewpoint images).

A technique for estimating a position and an attitude of a camera based on multi-viewpoint images is known as SfM (Structure from Motion) and a technique for generating a 3D point cloud from multi-viewpoint images is known as MVS (Multi-View Stereo). Combining SfM and MVS makes it possible to estimate a 3D model of an object based on multi-viewpoint images.

In the technique described in Patent Literature 1, a high-accuracy 3D point cloud obtained using a laser scanner is used making matching with a 3D model of an overhead wire possible and, as a result, overhead wire recognition is made possible.

On the other hand, there are needs for overhead wire recognition by use of a digital camera such as a dashboard camera or a smart phone without requiring an expensive laser scanner.

Applying the SfM and MVS makes it possible to generate a 3D point cloud based on multi-viewpoint images. However, unlike high-accuracy 3D point clouds obtained using a laser scanner, 3D point clouds recovered from multi-viewpoint images are low in accuracy, so that applying the techniques for overhead wire recognition is difficult. Particularly, finding corresponding points by feature matching between images of a long object like an overhead wire is difficult. Therefore, 3D point clouds generated using the SfM and MSV look broadened due to errors included.

An object of the present invention is to provide an overhead wire recognition device and an overhead wire recognition method which make overhead wire recognition possible using plural images taken by an imaging device, for example, a digital camera from different viewpoints.

Solution to Problem

The present invention provides plural means for solving the above problem. For example, an overhead wire recognition device includes: an input unit to which plural input images taken by a camera from different viewpoints and position and attitude information about the camera are inputted; an overhead wire candidate extraction unit which selects, from the input images inputted to the input unit, an overhead wire region including an overhead wire and extracts, from the overhead wire region, a line segment as a candidate of the overhead wire; and an overhead wire model estimation unit which projects the candidate line segment in an imaginary 3D space, determines, based on the candidate line segment, the position and attitude information about the camera, and the input images, a plane where the overhead wire is present in the 3D space, and estimates a 3D model of the overhead wire.

Advantageous Effects of Invention

According to the present invention, overhead wire recognition is possible using plural images taken by an imaging device, for example, a digital camera from different viewpoints. Other objects, configurations, and effects of the present invention will become clear from the following description of embodiments.

BRIEF DESCRIPTION OF DRAWINGS

FIG. 3 is a diagram showing a flow of processing executed by an overhead wire candidate extraction unit.

FIG. 5 is a diagram illustrating, as an example method of selecting, out of plural input images, images of a 3D overhead wire region, a method of narrowing down the candidate images based on the distances between the camera positions and the 3D overhead wire region.

FIG. 6 is a diagram illustrating, as an example method of selecting, out of plural input images, images of a 3D overhead wire region, a method of selecting final images based on the angles formed between the camera positions and the 3D overhead wire region.

DESCRIPTION OF EMBODIMENTS

In the following, embodiments of an overhead wire recognition device and an overhead wire recognition method according to the present invention will be described with reference to drawings. In the following description of this specification, parts identical or similar between drawings will be denoted by identical or similar reference signs and repetitious descriptions of such parts may be omitted.

First Embodiment

A first embodiment of the overhead wire recognition device and the overhead wire recognition method according to the present invention will be described with reference to FIG. 1 to FIG. 15B.

Figure 1:
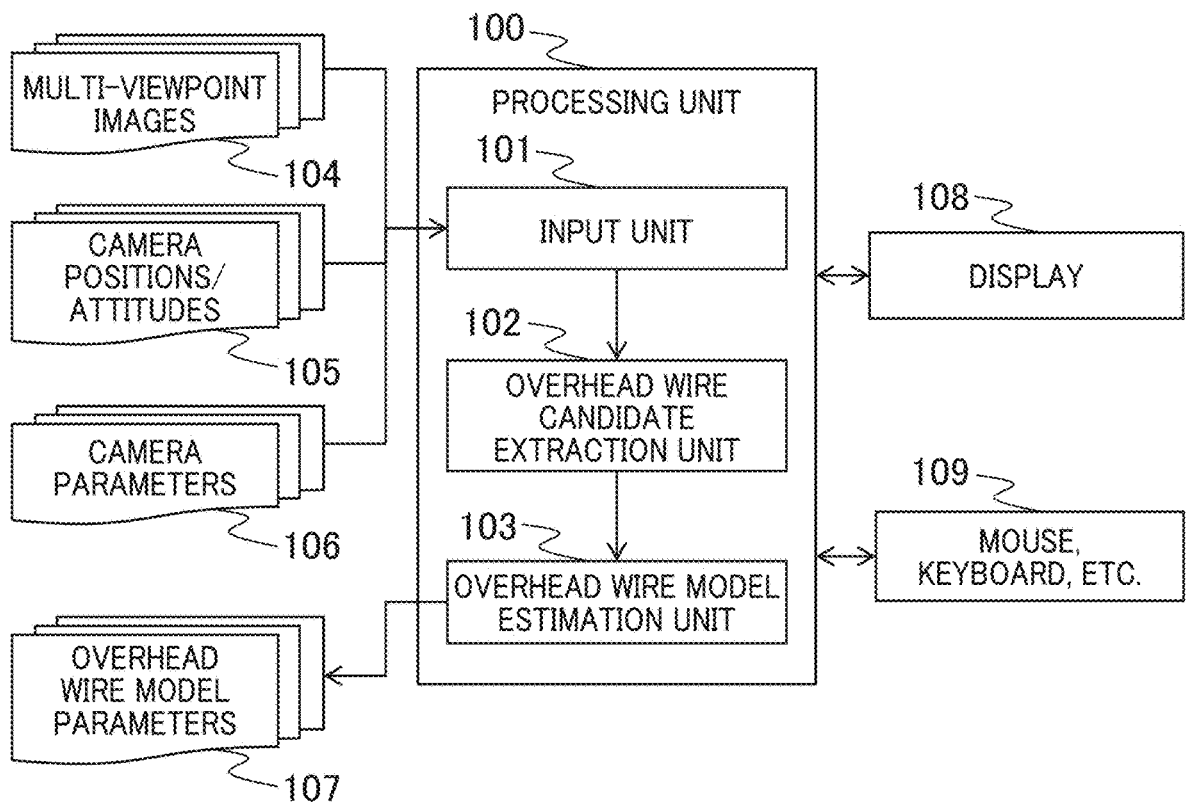
FIG. 1 is a configuration diagram of an overhead wire recognition device according to a first embodiment.

First, an overall configuration of the overhead wire recognition device according to the first embodiment will be described with reference to FIG. 1. FIG. 1 is a configuration diagram of the overhead wire recognition device according to the first embodiment.

As shown in FIG. 1, the overhead wire recognition device of the first embodiment is configured mainly with a processing unit 100 including an input unit 101, an overhead wire candidate extraction unit 102, and an overhead wire model estimation unit 103. Preferably, the processing unit 100 serves as a main part to execute the overhead wire recognition method. In this specification, overhead wire recognition is to grasp a three-dimensional configuration in real space of an overhead wire, that is, to estimate a 3D model of an overhead wire.

The overhead wire recognition device can be realized by software processing executed by a general information processing device and is preferably configured including a computer. The computer is provided with a CPU, a memory, an interface, a display 108 for displaying, for the user, processing results, a keyboard/mouse 109 for accepting inputs from the user, and a recording device. Based on various programs, the computer controls the operation of each device and various arithmetic operations being described later. The programs are stored in, for example, an internal recording medium, an external recording medium, or a data server (none shown) included in each configuration and are read out and executed by the CPU.

The control processing may be integrated in a single program or divided in plural programs, or arranged as a combination of both. The programs may be realized partly or entirely by dedicated hardware, or may be modularized. Furthermore, various programs may be installed from, for example, a program distribution server, an internal storage medium, or an external storage medium.

The processing unit 100 receives inputs from multi-viewpoint images 104, camera positions/attitudes 105, and camera parameters 106, and outputs the received inputs as overhead wire model parameters 107.

The multi-viewpoint images 104 are plural images taken, using an imaging device, for example, a digital camera from different viewpoints. They include, for example, a series of video images forward and rearward of a vehicle taken with a dashboard camera while the vehicle is traveling and images taken in arbitrary directions at various sites with a smartphone.

The camera positions/attitudes 105 represent positions and attitudes of the camera used to take the multi-viewpoint images 104 and are referred to as external parameters of the camera. The camera positions/attitudes 105 can be acquired using, for example, a GPS receiver and a gyroscope mounted on the camera. It is also possible, using a known technique called SfM, to estimate camera positions and attitudes based on the multi-viewpoint images 104.

What can be estimated by SfM are relative positions and attitudes between cameras, and overall scales and rotations cannot be estimated. To estimate overall scales and rotations requires global positional information such as GPS information.

The camera parameters 106 represent camera-specific parameters such as focal lengths and distortion coefficients of lenses and are called internal parameters of cameras. The camera parameters 106 can be acquired, depending on the cameras, using SDKs (Software Development Kits) provided for the cameras. Also, the camera parameters 106 can be acquired based on plural images taken from different viewpoints of a graphic pattern of a known size. Acquiring the camera parameters 106 is referred to as calibration. The calibration function is available from a general-purpose image processing library, for example, OpenCV (https://opencv.org).

The input unit 101 accepts as inputs the multi-viewpoint images 104 taken by a camera from different viewpoints, camera positions/attitudes 105, and camera parameters 106. Preferably, the input unit 101 serves as a main part to execute the input step.

The overhead wire candidate extraction unit 102 selects, out of the multi-viewpoint images 104 accepted as inputs in the input unit 101, plural images of a target overhead wire 200 (see FIG. 2). Furthermore, the overhead wire candidate extraction unit 102 sets, on each of the selected images, a 2D overhead wire region where the target overhead wire 200 is present and extracts, by image processing for outline extraction, a candidate line segment to represent the target overhead wire 200 from the 2D overhead wire region. Preferably, the overhead wire candidate extraction unit 102 serves as a main part to execute the overhead wire candidate extraction step.

The overhead wire model estimation unit 103 assumes that, in an imaginary 3D space, a vertical plane is erected on the ground where the overhead wire 200 is present. Based on the camera positions/attitudes 105, a candidate line segment to represent the overhead wire 200 on a selected image is projected on the vertical plane, and a shape of the overhead wire 200 on the vertical plane is obtained by curve fitting. This is done also for other selected images, and shapes of the overhead wire 200 are obtained by curve fitting. Subsequently, the results of curve fitting made for the plural selected images are evaluated as to the degree of matching, and the vertical planes corresponding to high degrees of matching are estimated to be planes where the overhead wire 200 is present. The parameters representing a vertical plane and the parameters generated by curve fitting combined are estimated to be a 3D model of the overhead wire 200 and are outputted as overhead wire model parameters 107. Preferably, the overhead wire model estimation unit 103 serves as a main part to execute the overhead wire model estimation step.

Figure 2A:
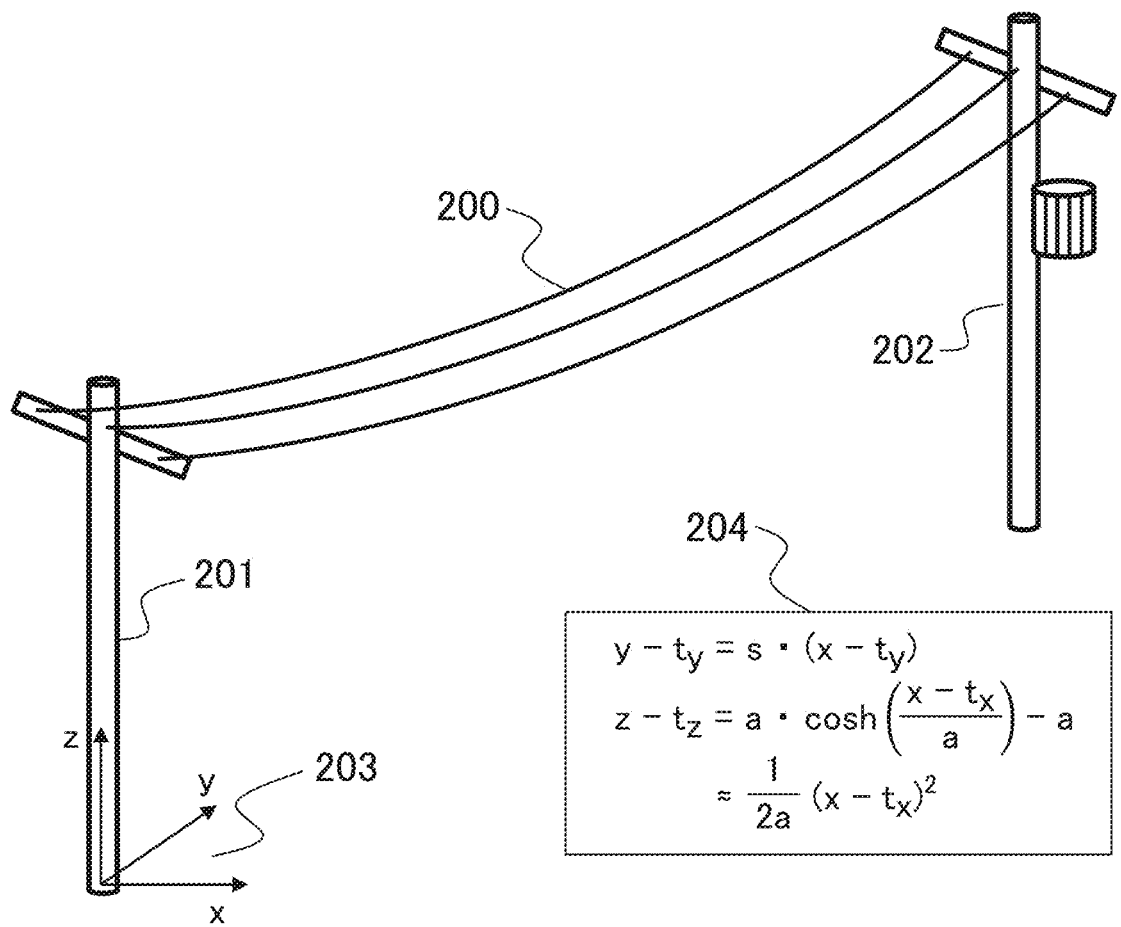
FIG. 2A is a diagram showing a 3D model of an overhead wire to be estimated by the overhead wire recognition device.
Figure 2B:
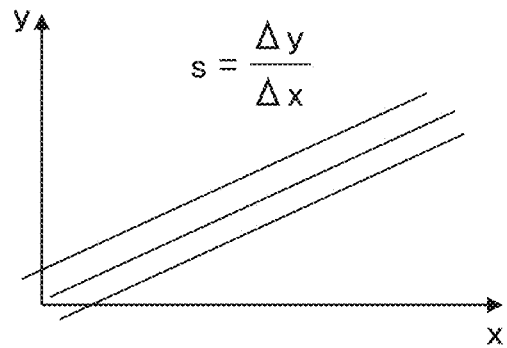
FIG. 2B is a diagram showing a 3D model represented on an xy plane of an overhead wire to be estimated by the overhead wire recognition device.
Figure 2C:
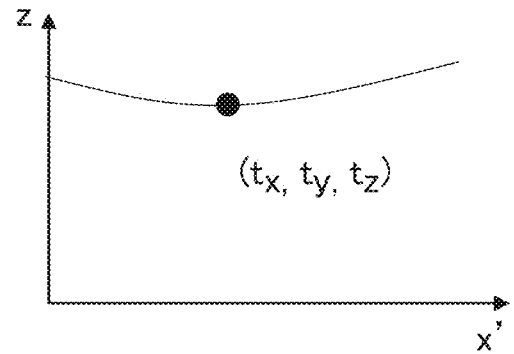
FIG. 2C is a diagram showing a 3D model represented on an xz plane of an overhead wire to be estimated by the overhead wire recognition device.

With reference to FIG. 2A to FIG. 2C, a 3D model of an overhead wire 200 estimated by the overhead wire model estimation unit 103 of the overhead wire recognition device of the first embodiment will be described. FIG. 2A is a diagram showing a 3D model of the overhead wire 200 to be estimated by the overhead wire recognition device; FIG. 2B is a diagram showing the 3D model of the overhead wire 200 represented on an xy plane; and FIG. 2C is a diagram showing the 3D model of the overhead wire 200 represented on an xz plane.

In the example shown in FIG. 2A, the overhead wire 200 is stretched between an overhead wire pole 201 and an overhead wire pole 202. The overhead wire 200 is curved with its center hanging down due to slackening caused by the balance between the tensile force and the gravity to which the overhead wire 200 is subjected between its joints with the overhead wire poles 201 and 202. The curve is called a catenary curve. When a coordinate system 203 is set at the root of the overhead wire pole 201, the 3D model of the overhead wire 200 is represented, as an example, by an overhead wire 3D model 204. The coordinate system 203 has, for example, an x axis extending eastward, a y axis extending northward, and a z axis extending vertically upward, but the axis arrangement is not limited to this.

FIG. 2B is a diagram representing the overhead wire 200 as viewed from straight above. When a view of the overhead wire 200 seen from straight above is projected on a vertical plane erected on the ground where the overhead wire 200 is present, the overhead wire 200 is seen as a straight line. The inclination of the straight line is denoted as "s".

FIG. 2C is a direct lateral view of a vertical plane erected on the ground where the overhead wire 200 is present. The overhead wire 200 represents, when directly laterally viewed, a catenary curve. The lowest point of the catenary curve is expressed as (tx, ty, tz).

In the 3D model 204 of the overhead wire 200, the inclination s of the vertical plane and the lowest point (tx, ty, tz) of the catenary curve are represented as parameters. It is also possible to approximate the catenary curve by a quadratic equation like the 3D model 204.

The overhead wire 200 is, for example, an electric wire, a communication wire, a cable, or the like. In the present embodiment, the joints between the overhead wire 200 and the overhead wire poles 201 and 202 are made support points, but the support points for the overhead wire 200 are not limited to the overhead wire poles 201 and 202. The support points may be where the overhead wire 200 is joined to a building or where the overhead wire 200 is branched from another overhead wire 200.

Next, with reference to FIG. 3, the flow of overhead wire candidate extraction processing executed by the overhead wire candidate extraction unit 102 of the overhead wire recognition device of the first embodiment will be described. FIG. 3 shows the flow of processing executed by the overhead wire candidate extraction unit 102.

First, as shown in FIG. 3, the overhead wire candidate extraction unit 102 inputs, in step S301, 3D coordinates P1, P2 of the two overhead wire poles 201, 202 supporting, as shown in FIG. 2, the overhead wire 200. The 3D coordinates P1, P2 represent the 3D coordinates of the uppermost parts of the overhead wire poles 201, 202. They are to be calculated, for example, making use of information about the positions and heights of the overhead wire poles 201, 202 managed as equipment information.

Next, in step S302, the overhead wire candidate extraction unit 102 sets, in an imaginary 3D space, a 3D overhead wire region where the overhead wire 200 is possibly present between the two overhead wire poles 201, 202.

Next, in step S303, the overhead wire candidate extraction unit 102 selects, based on the camera positions/attitudes 105, plural images of the 3D overhead wire region out of the multi-viewpoint images 104.

Next, in step S304, the overhead wire candidate extraction unit 102 sets, in each of the images of the 3D overhead wire region selected in step S303, a 2D overhead wire region where the target overhead wire 200 is present.

Next, in step S305, the overhead wire candidate extraction unit 102 extracts, from the 2D overhead wire region in each of the images selected in step S303, a line segment as an overhead wire candidate. The line segment to be an overhead wire candidate can be extracted, for example, by outline extraction in image processing.

Figure 4A:
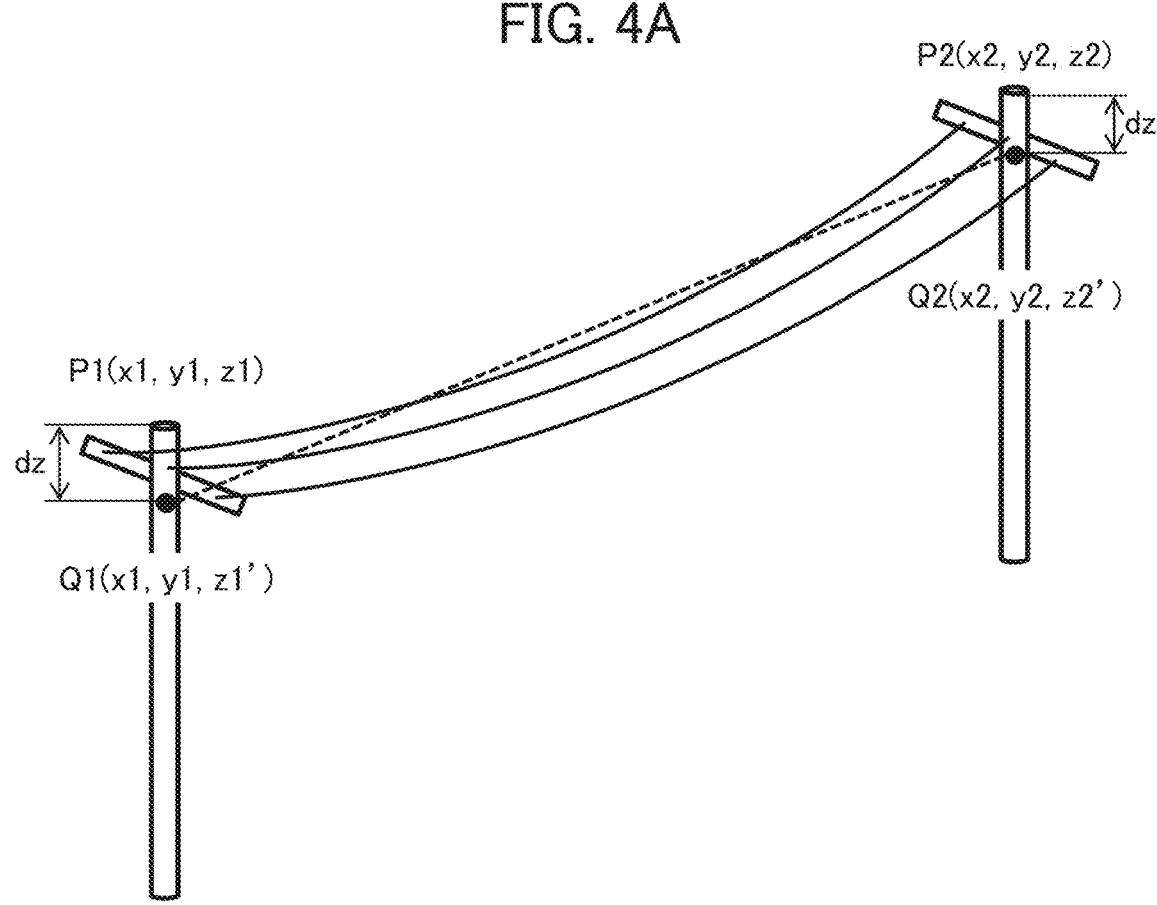
FIG. 4A is a diagram illustrating an example method of setting a 3D overhead wire region.
Figure 4B:
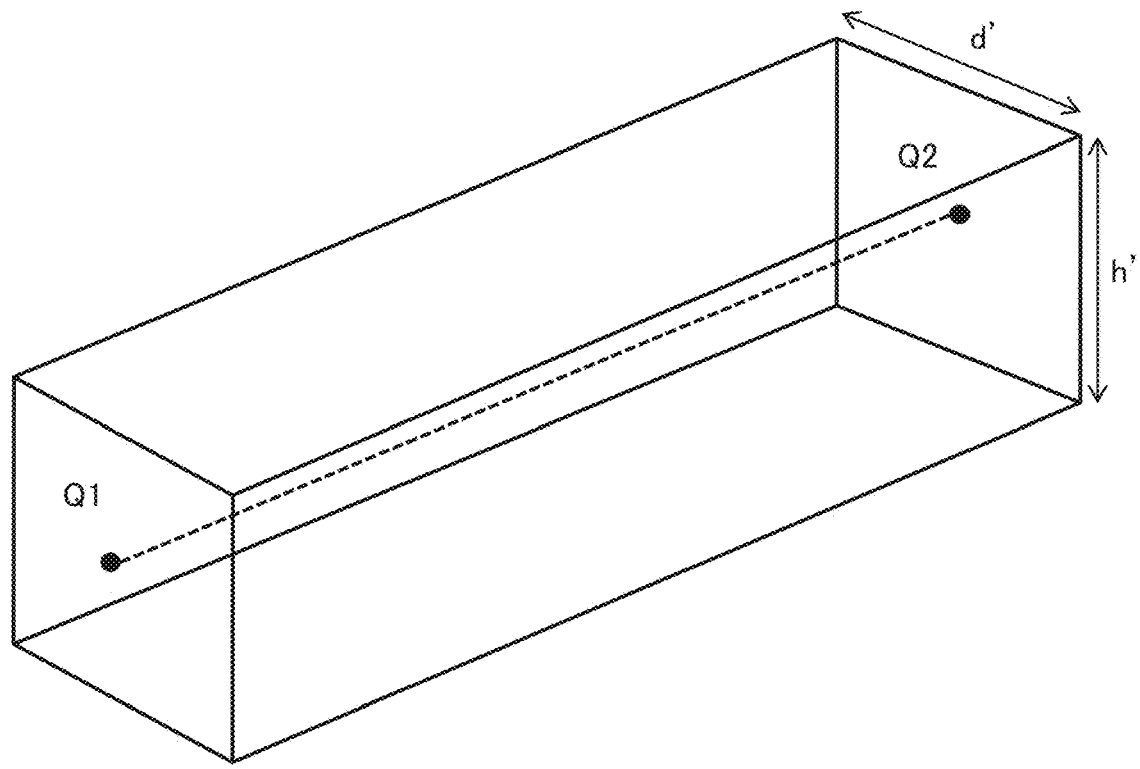
FIG. 4B is a diagram illustrating an example method of setting a 3D overhead wire region.

Next, with reference to FIG. 4A and FIG. 4B, a method of setting a 3D overhead wire region in step S302 will be described. FIG. 4A is a diagram illustrating an example method of determining a reference line for setting a 3D overhead wire region. FIG. 4B is a diagram illustrating an example method of setting a 3D overhead wire region for a reference line Q1Q2.

As shown in FIG. 4A, the overhead wire candidate extraction unit 102 sets, as reference points, points Q1, Q2 determined by moving, from the 3D coordinates P1, P2 inputted in step S301 of the uppermost parts of the overhead wire poles 201, 202, vertically downward by a specified distance dz, a setting parameter, and sets a line connecting the reference points Q1, Q2 as a reference line Q1Q2.

Subsequently, as shown in FIG. 4B, the overhead wire candidate extraction unit 102 sets, as a 3D overhead wire region, a region formed, for example, by sweeping a rectangle which includes the reference point Q1 at its center and has a height h' and a depth d' as setting parameters from the reference point Q1 to the reference point Q2.

Next, with reference to FIG. 5, as an example method of selecting plural images in step S303, a method of narrowing down the candidate images based on the distances between the camera positions and the 3D overhead wire region will be described. FIG. 5 is a diagram illustrating, as an example method of selecting, out of plural input images, images of the 3D overhead wire region, a method of narrowing down the candidate images based on the distances between the camera positions and the 3D overhead wire region.

First, as shown in FIG. 5, the overhead wire candidate extraction unit 102 determines, in step S501, a central coordinate Q0 (x0, y0) of the reference line Q1Q2 on an xy plane parallel to the ground surface.

Next, in step S502, the overhead wire candidate extraction unit 102 determines distance r between each camera position C (X, Y) and the central coordinate Q0 on the xy plane parallel to the ground surface.

Next, in step S503, the overhead wire candidate extraction unit 102 determines whether or not the distance r between each camera position C (X, Y) and the central coordinate Q0 is in the range between a maximum value Rmax and a minimum value Rmin specified as setting parameters. When the determination is affirmative, processing advances to step S504 and, when the determination is negative, processing is ended.

Next, in step S504, the overhead wire candidate extraction unit 102 selects the image corresponding to the camera position, then completes the processing.

When no image is selected for any camera position, an error message is outputted, for example, to the display 108 and processing is ended without executing the processing being described in the following.

Next, with reference to FIG. 6, as another example method of selecting plural images in step S303, a method of selecting final images based on the angles formed between the camera positions and the 3D overhead wire region will be described. FIG. 6 is a diagram illustrating, as another example method of selecting, out of plural input images, images of the 3D overhead wire region, a method of selecting final images based on the angles formed between the camera positions and the 3D overhead wire region.

First, as shown in FIG. 6, the overhead wire extraction unit 102 connects, in step S601, camera Cn and reference points Q1, Q2 on an xy plane parallel to the ground surface and acquires a bisector of angle Q1·Cn·Q2.

Next, in step S602, the overhead candidate extraction unit 102 determines angle θn formed between the bisector acquired in step S601 and the reference line Q1Q2.

Next, in step S603, the overhead candidate extraction unit 102 selects, as candidates, the images with the angles θ determined in S602 closest to two specified angles ⊖ (⊖7 and ⊖3) and π-⊖, respectively. The two specified angles may be, for example, 45 degrees and 135 degrees, without being limited to.

Figure 7A:
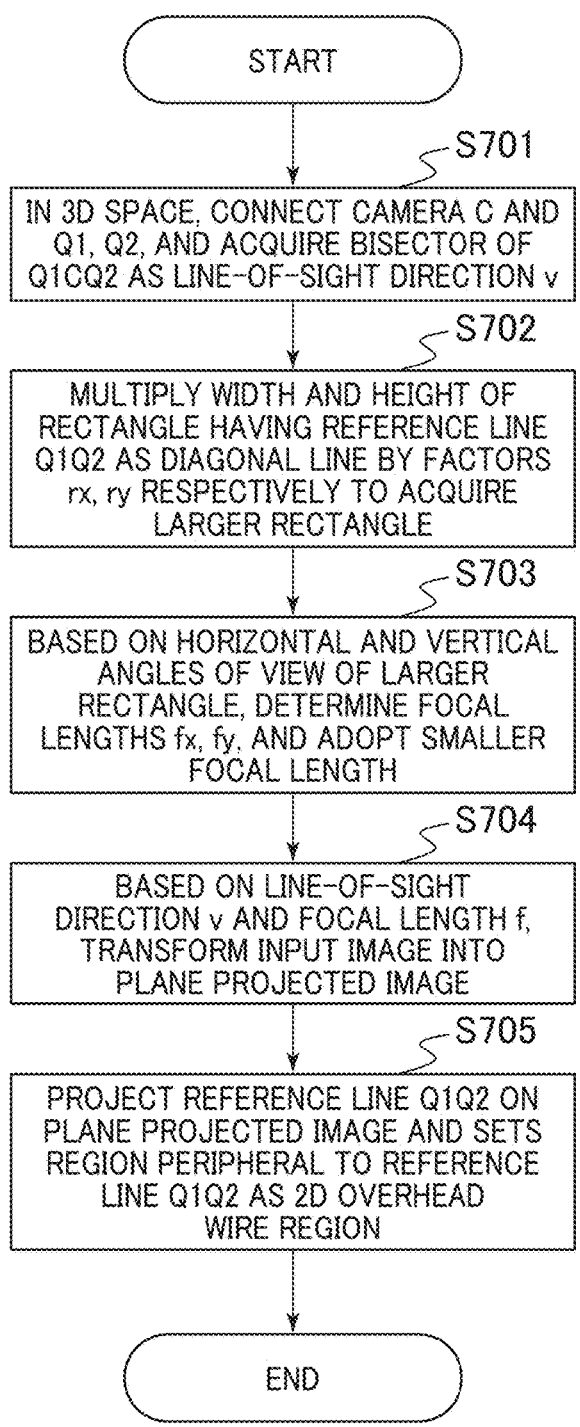
FIG. 7A is a diagram showing a flow of processing for transforming each of the plural selected input images into a plane projected image with focusing on the 3D overhead wire region.
Figure 7B:
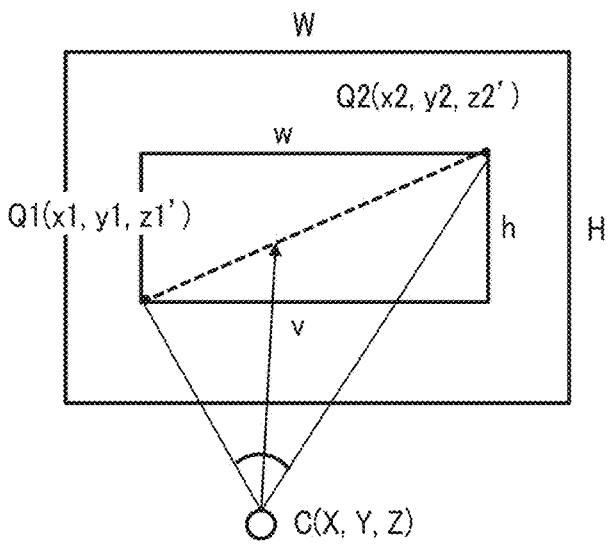
FIG. 7B is a diagram illustrating an example method of transforming each of the plural selected images into a plane projected image with focusing on the 3D overhead wire region and setting a 2D overhead wire region.
Figure 7C:
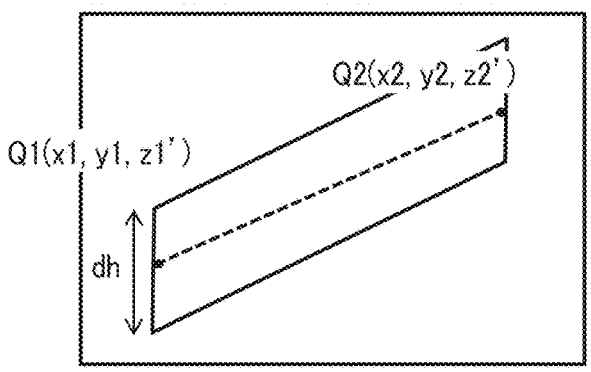
FIG. 7C is a diagram illustrating an example method of transforming each of the plural selected images into a plane projected image with focusing on the 3D overhead wire region and setting a 2D overhead wire region.

Next, with reference to FIG. 7A to FIG. 7C, a method of setting, in step S304, a 2D overhead wire region by transforming each of the plural selected input images into a plane projected image with the direction toward the 3D overhead wire region set as the line-of-sight direction will be described. FIG. 7A is a diagram showing the flow of processing for transforming each of the plural selected input images into a plane projected image with focusing on the 3D overhead wire region and setting a 2D overhead wire region. FIG. 7B and FIG. 7C are diagrams illustrating an example method of transforming each of the plural selected images into a plane projected image with focusing on the 3D overhead wire region and setting a 2D overhead wire region.

First, as shown in FIG. 7A and FIG. 7B, the overhead wire candidate extraction unit 102 connects, in step S701, the position of camera C and two reference points Q1, Q2 in a 3D space, acquires a bisector of angle Q1·C·Q2, and determines the acquired bisector as a line-of-sight direction v.

Next, as shown in FIG. 7B, the overhead wire candidate extraction unit 102 multiplies, in step S702, width w and height h of a rectangle having a reference line Q1Q2 as a diagonal line by factors rx, ry, respectively, and, thereby, acquires a larger-sized (W, H) rectangle.

Next, in step S703, the overhead wire candidate extraction unit 102 determines focal lengths fx, fy based on the horizontal and vertical angles of view of the larger rectangle acquired in step S702, and adopts the smaller one of the focal lengths.

Next, in step S704, the overhead wire candidate extraction unit 102 transforms each input image into a plane projected image based on the line-of-sight direction v and focal length f.

Next, in step S705, the overhead wire candidate extraction unit 102 projects the reference line Q1Q2 on each plane projected image and sets a region peripheral to the reference line Q1Q2 as a 2D overhead wire region. For example, as shown in FIG. 7C, a parallelogram formed by parallel-shifting the reference line Q1Q2 vertically by a distance dh is made the 2D overhead wire region.

Figure 8A:
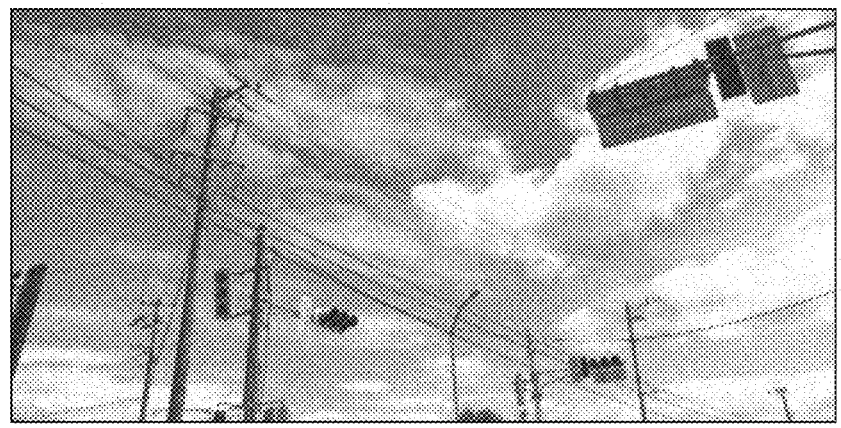
FIG. 8A shows one of two examples of plane projected images generated by transforming two selected input images.
Figure 8B:
FIG. 8B shows the other of the two examples of plane projected images generated by transforming two selected input images.

FIG. 8A and FIG. 8B show example plane projected images generated by transforming two selected input images. FIG. 8A corresponds to an image of the 3D overhead wire region as seen from left. FIG. 8B corresponds to an image of the 3D overhead wire region as seen from right.

From both images, it is seen that adjustment has been made to show the 2D overhead wire region 2D within the angle of view.

Figure 9:
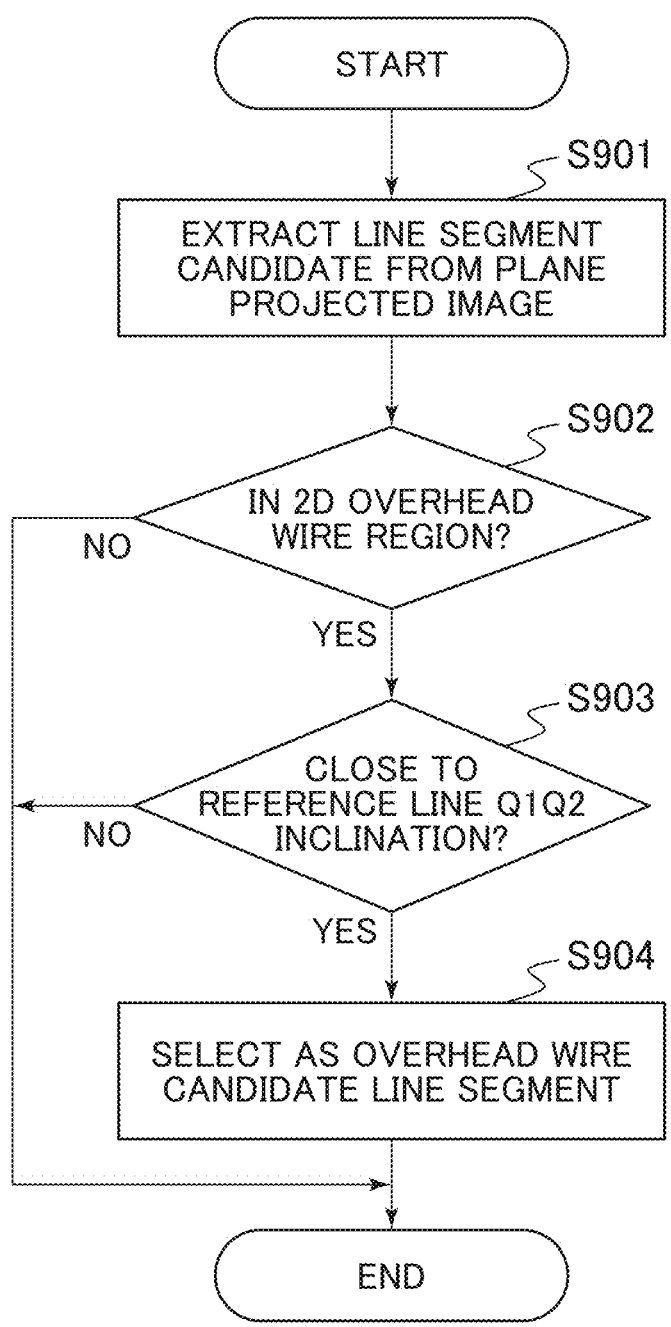
FIG. 9 is a diagram showing a flow of processing for extracting a line segment as an overhead wire candidate from a 2D overhead wire region.

Next, with reference to FIG. 9, a method of extracting line segments as overhead wire candidates from the 2D overhead wire region will be described. FIG. 9 is a diagram showing a flow of processing for extracting a line segment as an overhead wire candidate from the 2D overhead wire region.

First, as shown in FIG. 9, the overhead wire candidate extraction unit 102 extracts, in step S901, a line segment candidate from each plane projected image generated by transformation in step S704. The line segment candidate is extracted, for example, by image outline extraction.

Next, in step S902, the overhead wire candidate extraction unit 102 determines whether or not the line segment candidate extracted in step S901 is in the 2D overhead wire region set in step S705. When the line segment candidate is determined to be in the 2D overhead wire region, processing is advanced to the next step S903. When the line segment candidate is determined not to be in the 2D overhead wire region, processing is ended.

Next, in step S903, the overhead wire candidate extraction unit 102 determines the angular difference between the inclination of the line segment candidate and the inclination of the reference line Q1Q2 and, by applying an angular difference threshold as a setting parameter, determines whether or not the angular difference is within the threshold. When the angular difference is determined to be within the threshold, processing is advanced to the next step S904. When the angular difference is determined not to be within the threshold, processing is ended.

Next, in step S904, the overhead wire candidate extraction unit 102 selects, as an overhead wire candidate, each line segment meeting the conditions applied in the preceding steps S902 and S903, and ends the processing.

Figure 10A:
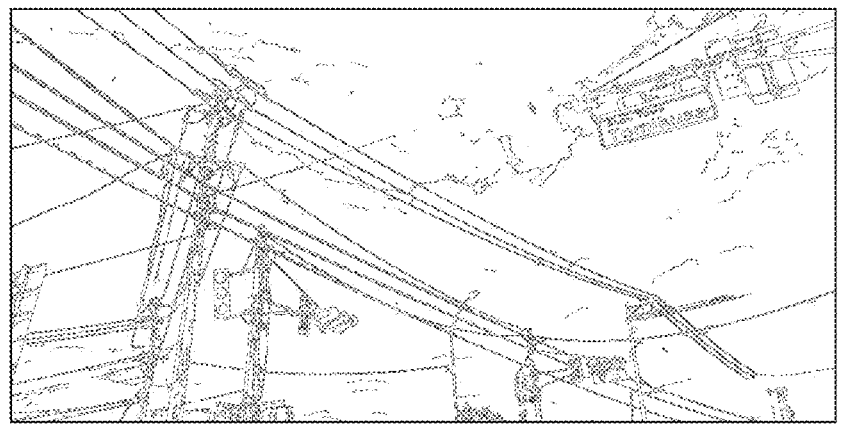
FIG. 10A is a diagram showing an example of outline extraction from the plane projected image shown in FIG. 8A.
Figure 10B:
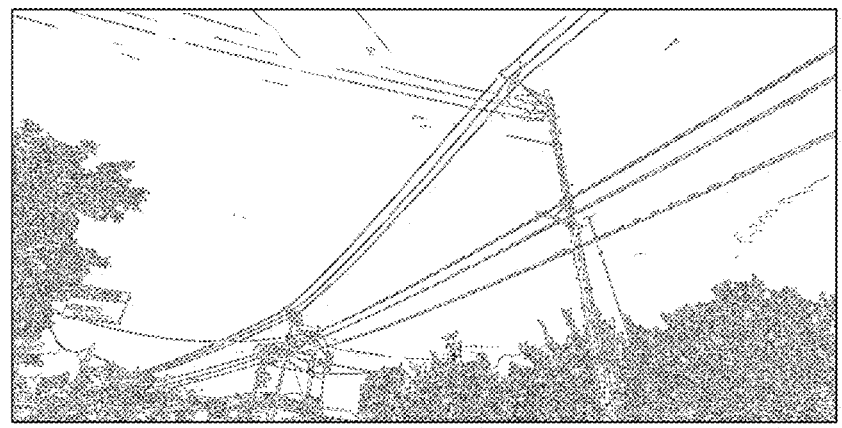
FIG. 10B is a diagram showing an example of outline extraction from the plane projected image shown in FIG. 8B.

FIG. 10A and FIG. 10B show example results of outline extraction from the plane projected images shown in FIG. 8A and FIG. 8B. The results shown in FIG. 10A and FIG. 10B have been obtained by transforming the colored images shown in FIG. 8A and FIG. 8B into gray scale images and extracting, based on the gray scale gradient, image parts with large gradients as forming an outline.

Figure 11A:
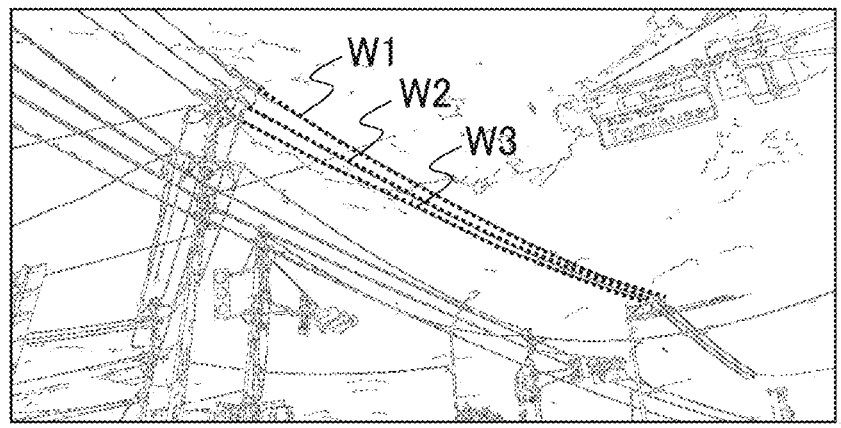
FIG. 11A is a diagram showing an example method of extracting overhead wire candidates from the result of outline extraction shown in FIG. 10A.
Figure 11B:
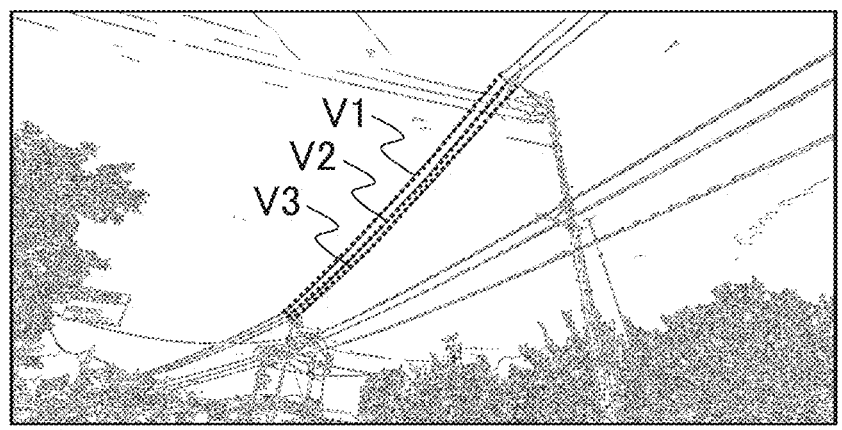
FIG. 11B is a diagram showing an example method of extracting overhead wire candidates from the result of outline extraction shown in FIG. 10B.

FIG. 11A and FIG. 11B each show an example method of extracting overhead wire candidates from the results of outline extraction shown in FIG. 10A and FIG. 10B.

In the case of an image showing the sky in the background, outlines of overhead wires 200 are clear, so that overhead wire candidates can be extracted by the automatic processing described with reference to FIG. 9. W1, W2, W3 in FIG. 11A and V1, V2, V3 in FIG. 11B denote extracted overhead wire candidates.

In the case of an image showing a building or vegetation background, outlines of overhead wires 200 are not clear, so that extracting overhead wire candidates by automatic processing is difficult. As an alternative means for such a case, a means for manually inputting polygons to represent overhead wire candidates in plane projected images may be provided.

Figure 12A:
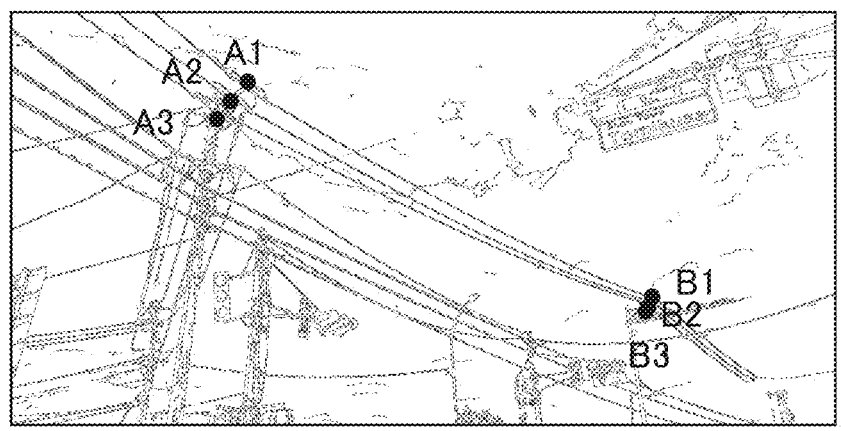
FIG. 12A is a diagram showing another example method of extracting overhead wire candidates from the result of outline extraction shown in FIG. 10A.
Figure 12B:
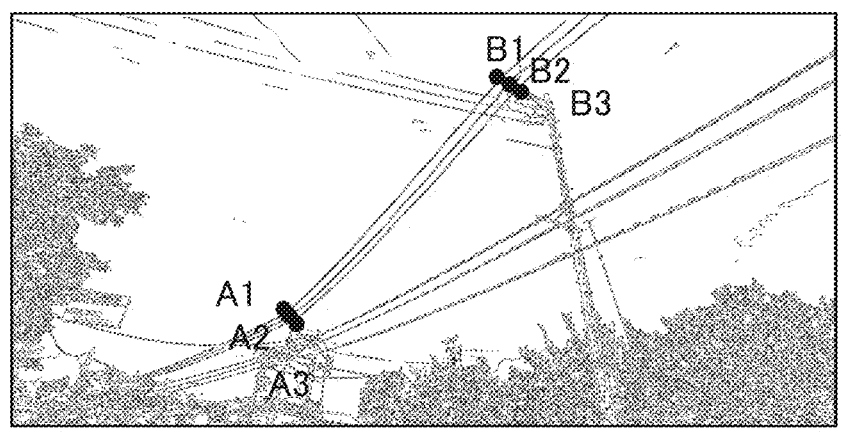
FIG. 12B is a diagram showing another example method of extracting overhead wire candidates from the result of outline extraction shown in FIG. 10B.

FIG. 12A and FIG. 12B show still another example method of extracting overhead wire candidates from the results of outline extraction shown in FIG. 10A and FIG. 10B. In this case, beginning points A1, A2, A3 and end points B1, B2, B3 of overhead wire candidates are manually inputted against the plane projected image background.

An image showing a building or vegetation background poses a problem that parts of buildings or vegetation are extracted as overhead wire candidates. Manually inputted beginning points and end points can be used as restrictions at the time of fitting, making it possible to execute processing even in cases where automatic processing is not practicable.

Figure 13:
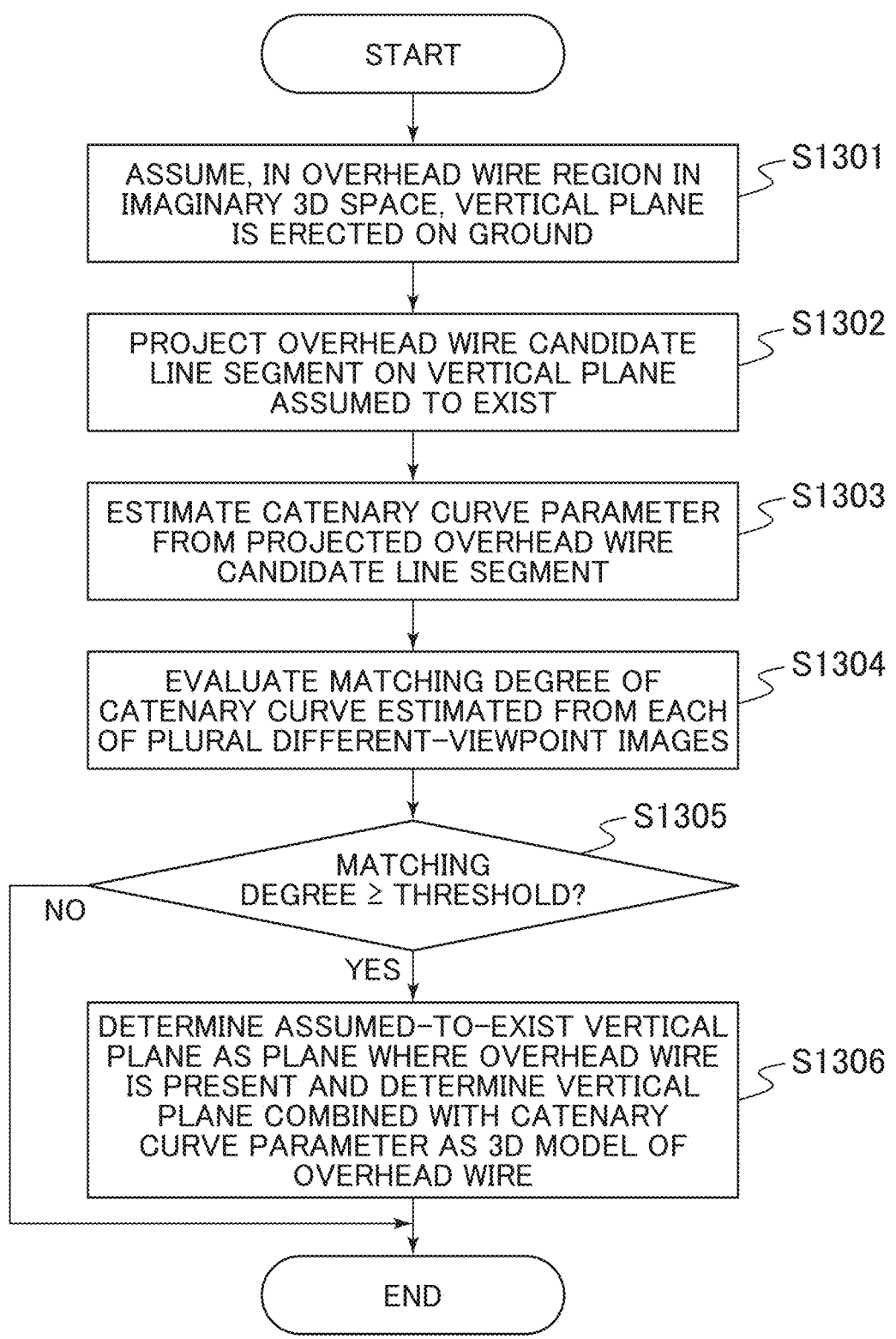
FIG. 13 is a diagram showing a flow of processing executed by an overhead wire model estimation unit.

Next, with reference to FIG. 13, a flow of processing executed by the overhead wire model estimation unit 103 will be described. FIG. 13 shows the flow of processing executed by the overhead wire model estimation unit 103.

First, as shown in FIG. 13, the overhead wire model estimation unit 103 assumes, in step S1301, that a vertical plane is erected on the ground in an overhead wire region in an imaginary 3D space. Subsequently, in step S1302, the overhead wire model estimation unit 103 projects, on the vertical plane assumed to exist, the line segment selected as an overhead wire candidate in step S904.

Next, the overhead wire model estimation unit 103 estimates, in step S1303, a catenary curve parameter from each line segment projected as an overhead wire candidate in step S1302 and, in step S1304, evaluates the degree of matching of the catenary curve estimated from each of plural images of different viewpoints.

Next, in step S1305, the overhead model estimation unit 103 determines whether or not the degree of matching of each catenary curve evaluated in step S1304 is equal to or higher than a threshold specified as a setting parameter. When the degree of matching is equal to or higher than the threshold, processing is advanced to step S1306, otherwise, processing is ended.

Next, in step S1306, the overhead wire model estimation unit 103 regards the assumed-to-exist vertical plane that corresponds to a degree of matching determined to be larger or equal to the threshold as a plane on which an overhead wire 200 is present and determines the plane combined with a catenary curve parameter as a 3D model of an overhead wire 200.

Until processing has been completed for all line segments selected as overhead wire candidates, steps S1301 to S1306 are repeated.

Figure 14:
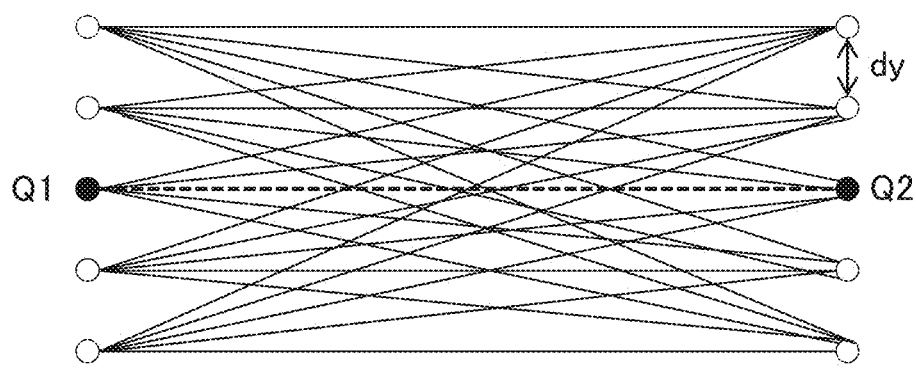
FIG. 14 is a diagram showing an example method of setting a plane vertical to the ground.

With reference to FIG. 14, a method of setting a vertical plane on the ground will be described.

FIG. 14 is a diagram showing the reference line Q1Q2 as seen from above but rotated to show the reference line Q1Q2 as horizontal. Plural additional points are generated by shifting the reference points Q1 and Q2 upward and downward so that all adjacent points on each side are apart by a specified distance dy, then, plural line segments connecting the points on the Q1 side and the points on the Q2 side are generated. In the example shown in FIG. 14, 25 line segments are generated. A vertical plane corresponding to each of the generated line segments is set on the ground.

Figure 15A:
FIG. 15A is a diagram showing a 3D point cloud displayed using existing techniques.
Figure 15B:
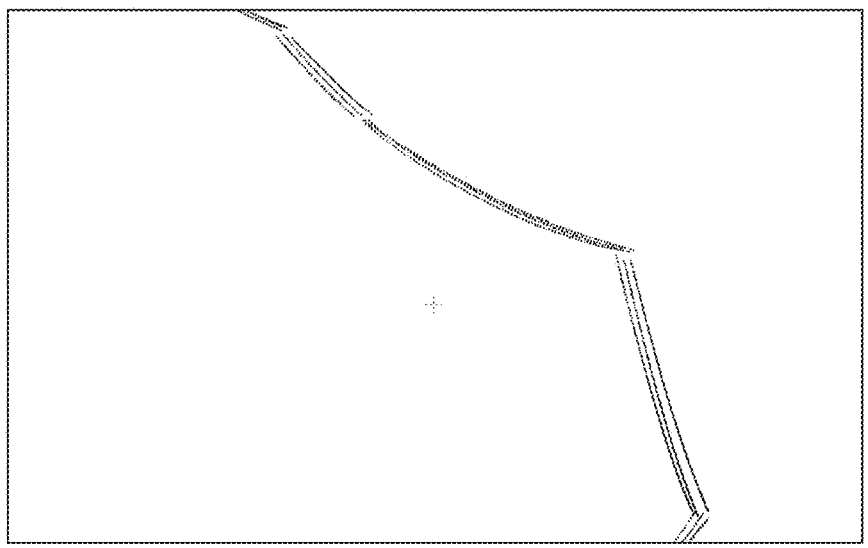
FIG. 15B is a diagram showing a 3D point cloud displayed by the overhead wire recognition device according to the first embodiment.

Next, with reference to FIG. 15A and FIG. 15B, effects of overhead wire recognition according to the present embodiment will be described. FIG. 15A is a diagram showing a 3D point cloud displayed using existing techniques. FIG. 15B is a diagram showing a 3D point cloud displayed by the overhead wire recognition device according to the first embodiment.

FIG. 15A shows a display of a 3D point cloud extracted from plural images of different viewpoints using existing techniques SfM and MVS. Though overhead wires 200 are partly extracted, the 3D point cloud corresponding to each overhead wire 200 is spread, so that estimating 3D models of overhead wires 200 is difficult. Also, there are many sections where overhead wires have not been extracted at all.

On the other hand, as shown in FIG. 15B, the 3D models of overhead wires 200 estimated by the overhead wire recognition device according to the present embodiment indicate that only overhead wires 200 have been extracted with almost no broken parts. From this, it is known that the overhead wires 200 have been recognized with high accuracy.

Next, the effects of the present embodiment will be described.

The overhead wire recognition device according to the first embodiment of the present invention described above includes an input unit 101 to which multi-viewpoint images 104 taken by a camera from different viewpoints and camera positions/attitudes 105 are inputted, an overhead wire candidate extraction unit 102 which selects, from the multi-viewpoint input images 104 inputted to the input unit 101, an overhead wire region including an overhead wire 200 and extracts, from the overhead wire region, a line segment as a candidate of the overhead wire 200, and an overhead wire model estimation unit 103 which projects the candidate line segment in an imaginary 3D space, determines, based on the candidate line segment, the camera positions/attitudes 105, and the multi-viewpoint images 104, a plane where the overhead wire 200 is present in the 3D space, and estimates a 3D model of the overhead wire 200. In the overhead wire recognition device, overhead wire candidates are extracted from plural input images taken by an imaging device from different viewpoints, and matching is made between overhead wire candidates projected in an imaginary 3D space, so that estimating a 3D model of the overhead wire 200, for which feature matching based on images is difficult, is possible. Since images taken by a general imaging device such as a digital camera can be used as input images, it is not necessary to use an expensive device such as a laser scanner. Thus, overhead wire recognition at low cost is made possible.

Second Embodiment

Figure 16:
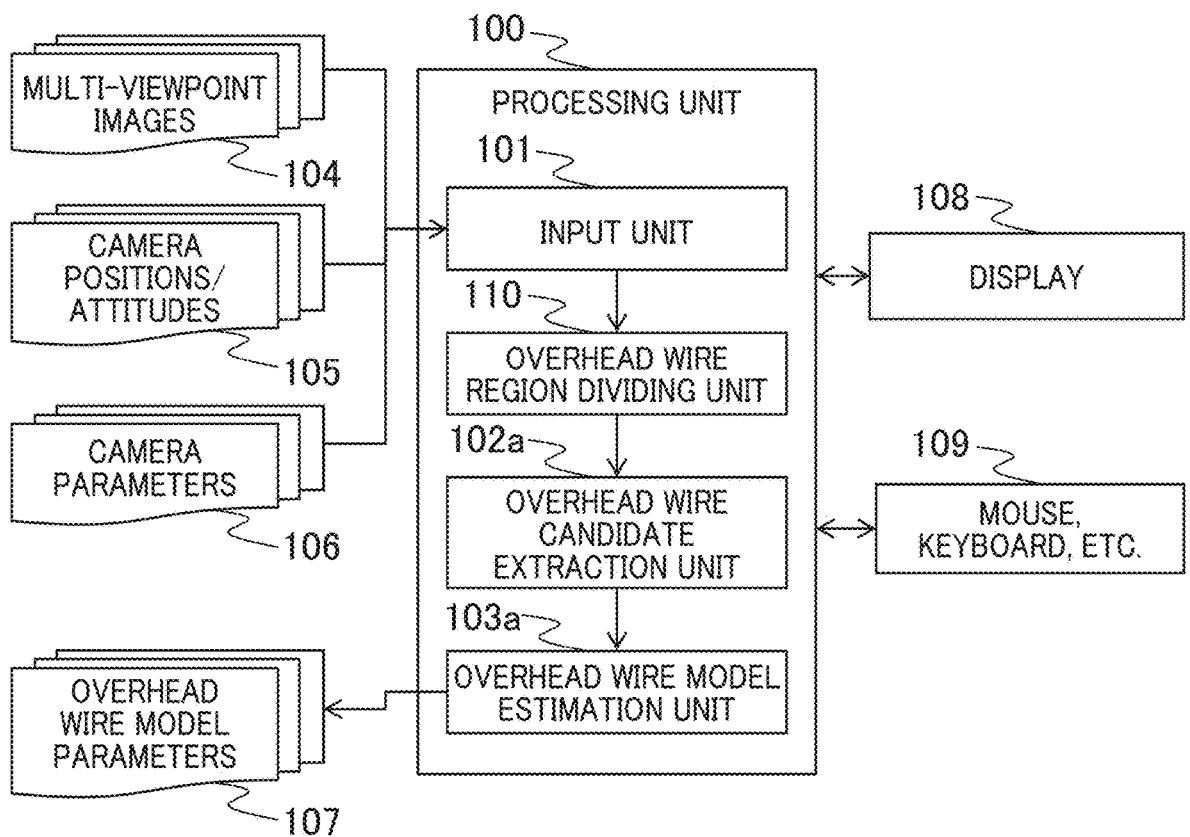
FIG. 16 is a configuration diagram of an overhead wire recognition device according to a second embodiment.

A second embodiment of the overhead wire recognition device and the overhead wire recognition method according to the present invention will be described with reference to FIG. 16. FIG. 16 is a configuration diagram of the overhead wire recognition device according to the second embodiment.

As shown in FIG. 4A and FIG. 4B, the overhead wire recognition device of the first embodiment sets an overhead wire region between two overhead wire poles 201 and 202, and selects plural input images of the overhead wire region taken from different viewpoints. When the two overhead wire poles 201 and 202 are far apart from each other, images of parts of the overhead wire 200 on the side far from the camera include large positional errors, so that there is room for improvement in this regard.

Also, as shown in FIG. 7A and FIG. 7B, in the case of the overhead wire recognition device of the first embodiment, it is assumed that the camera has an adequately wide angle of view and that the overhead wire region is within the view angle of the input image. Removing such restrictions, if possible, is considered to bring about advantages, for example, that a simpler configuration can be used.

The overhead wire recognition device and the overhead wire recognition method of the present embodiment shown in FIG. 16 includes configurations and steps for achieving the above objects.

Compared with the configuration shown in FIG. 1 of the first embodiment, the overhead wire recognition device of the second embodiment additionally includes, as shown in FIG. 16, an overhead wire region dividing unit 110 for dividing an overhead wire region into two or more sections.

This addition partly changes the processing to be executed by the overhead wire candidate extraction unit 102a and the overhead wire model estimation unit 103a.

The overhead wire region dividing unit 110 divides the reference line Q1Q2 into plural sections and sets, in the same manner as in the first embodiment, divided overhead wire regions.

The overhead wire candidate extraction unit 102a selects, in each of the divided overhead wire regions generated by division made by the overhead wire region dividing unit 110, plural input images and extracts overhead wire candidates.

The overhead wire model estimation unit 103a assumes, as in the first embodiment, that a vertical plane is erected, based on the reference line Q1Q2, on the ground where the overhead wire 200 is present, projects the overhead wire candidates extracted by the overhead wire candidate extraction unit 102a, and estimates an overhead wire model in the entire overhead wire region.

Other configurations and operations are substantially the same as in the foregoing first embodiment, so that their details will not be described in the following.

According to the overhead wire recognition device and the overhead wire recognition method of the second embodiment of the present invention, approximately the same effects as obtained according to the overhead wire recognition device and the overhead wire recognition method according to the foregoing first embodiment can be obtained.

With the overhead wire region dividing unit 110 to divide an overhead wire region into two or more sections additionally provided, the overhead wire candidate extraction unit 102a extracts overhead wire candidates in two or more overhead wire sections divided by the overhead wire dividing unit 110. This makes it possible to deal with a situation where the two overhead wire poles 201, 202 are far apart from each other and where, even with a camera with an adequately wide view angle used, an overhead wire region is not imaged to be inside the view angle of the input image. Namely, it becomes possible to deal with overhead wires 200 in various conditions and to reduce restrictions on the imaging device side.

Others

The present invention is not limited to the above embodiments and includes various modifications. The above embodiments have been described in detail to make the present invention easy to understand, and the present invention is not defined to include all the configurations described.

Furthermore, a part of a configuration of an embodiment can be replaced with a configuration of another embodiment, and a configuration of an embodiment can be added to by a configuration of another embodiment. Also, a part of the configuration of each embodiment may be added to or replaced by another configuration or may be deleted.

LIST OF REFERENCE SIGNS

. . . 100 Processing unit
. . . 101 Input unit
. . . 102, 102a Overhead wire candidate extraction unit
. . . 103, 103a Overhead wire model estimation unit
. . . 104 Multi-viewpoint images (plural input images)
. . . 105 Camera positions/attitudes (information about camera positions and attitudes)
. . . 106 Camera parameters
. . . 107 Overhead wire model parameters ... 108 Display
... 109 Mouse, keyboard, etc.
... 110 Overhead wire region dividing unit
... 200 Overhead wire
... 201, 202 Overhead wire pole
... 203 Coordinate system
... 204 3D model of overhead wire

The invention claimed is:

1. An overhead wire recognition device, comprising:
a processor; and
a memory storing instructions that when executed by the processor, configures the processor to:
acquire and store a plurality of digital images taken by a digital camera from different viewpoints and position and attitude information about the camera,
select, from the digital images, an overhead wire region including an overhead wire and extract, from the overhead wire region, a line segment as a candidate of the overhead wire,
project the candidate line segment in an imaginary 3D space,
determine, based on the candidate line segment, the position and attitude information about the camera, and the digital images, a plane where the overhead wire is present in the 3D space,
estimate a 3D model of the overhead wire,
represent the 3D model of the overhead wire by the plane where the overhead wire is present, the plane being vertical to the ground, and a curved line representing slackening, in an upper part of the plane, of the overhead wire,
input 3D coordinates of two overhead wire poles supporting the overhead wire,
set a 3D overhead wire region between the two overhead wire poles,
select, out of the digital images, a plurality of images showing the 3D overhead wire region,
set, on each of the selected images, a 2D overhead wire region included in the 3D overhead wire region,
extract, from the 2D overhead wire region in each of the selected images, the line segment of an overhead wire candidate,
determine, as reference points, two points reached by moving two uppermost points of the 3D coordinates of the two overhead wire poles respectively vertically downward by a specified distance,
determine, as a reference line, a line connecting the two reference points,
set a peripheral region about the reference line as the 3D overhead wire region,
select a position of the camera with a horizontal distance between a central coordinate of the reference line and the position of the camera falling in a range between a specified maximum value and a specified minimum value, and
select, out of the digital images, one corresponding to the position of the camera.

2. An overhead wire recognition device, comprising:
a processor; and
a memory storing instructions that when executed by the processor, configures the processor to:
acquire and store a plurality of digital images taken by a digital camera from different viewpoints and position and attitude information about the camera,
select, from the digital images, an overhead wire region including an overhead wire and extract, from the overhead wire region, a line segment as a candidate of the overhead wire,
project the candidate line segment in an imaginary 3D space,
determine, based on the candidate line segment, the position and attitude information about the camera, and the digital images, a plane where the overhead wire is present in the 3D space,
estimate a 3D model of the overhead wire,
represent the 3D model of the overhead wire by the plane where the overhead wire is present, the plane being vertical to the ground, and a curved line representing slackening, in an upper part of the plane, of the overhead wire,
input 3D coordinates of two overhead wire poles supporting the overhead wire,
set a 3D overhead wire region between the two overhead wire poles,
select, out of the digital images, a plurality of images showing the 3D overhead wire region,
set, on each of the selected images, a 2D overhead wire region included in the 3D overhead wire region,
extract, from the 2D overhead wire region in each of the selected images, the line segment of an overhead wire candidate,
determine, as reference points, two points reached by moving two uppermost points of the 3D coordinates of the two overhead wire poles respectively vertically downward by a specified distance,
determine, as a reference line, a line connecting the two reference points,
set a peripheral region about the reference line as the 3D overhead wire region,
connect, on a plane vertical to the ground, each position of the camera and each of the two reference points with a straight line,
determine a bisector of an angle formed by the two straight lines,
select a position of the camera with an angle formed between the bisector and the reference line being close to a specified angle, and
select, out of the digital images, one corresponding to the selected position of the camera.

3. An overhead wire recognition device, comprising:
a processor; and
a memory storing instructions that when executed by the processor, configures the processor to:
acquire and store a plurality of digital images taken by a digital camera from different viewpoints and position and attitude information about the camera,
select, from the digital images, an overhead wire region including an overhead wire and extract, from the overhead wire region, a line segment as a candidate of the overhead wire,
project the candidate line segment in an imaginary 3D space,
determine, based on the candidate line segment, the position and attitude information about the camera, and the digital images, a plane where the overhead wire is present in the 3D space,
estimate a 3D model of the overhead wire,
represent the 3D model of the overhead wire by the plane where the overhead wire is present, the plane being vertical to the ground, and a curved line representing slackening, in an upper part of the plane, of the overhead wire, input 3D coordinates of two overhead wire poles supporting the overhead wire, set a 3D overhead wire region between the two overhead wire poles, select, out of the digital images, a plurality of images showing the 3D overhead wire region, set, on each of the selected images, a 2D overhead wire region included in the 3D overhead wire region, extract, from the 2D overhead wire region in each of the selected images, the line segment of an overhead wire candidate, determine, as reference points, two points reached by moving two uppermost points of the 3D coordinates of the two overhead wire poles respectively vertically downward by a specified distance, determine, as a reference line, a line connecting the two reference points, set a peripheral region about the reference line as the 3D overhead wire region, connect, in a 3D space, a position of the camera and each of the two reference points with a straight line, determine a bisector of an angle formed by the two straight lines, and set the bisector as a line-of-sight direction, determine a focal length such that a rectangle including the reference line as a diagonal line is within a specified image size, transform a corresponding image into a plane projected image based on the line-of-sight direction and the focal length, and project the reference line on the plane projected image, and set a peripheral region about the projected reference line as the 2D overhead wire region.

4. The overhead wire recognition device according to claim 1, wherein the processor is configured to:

divide the 3D overhead wire region into two or more sections, and extract the overhead wire candidate from each of the two or more sections.

* * * * *